United States Patent
Hayashikawa et al.

(10) Patent No.: US 9,590,379 B2
(45) Date of Patent: Mar. 7, 2017

(54) GAS LASER OSCILLATION DEVICE

(71) Applicant: Panasonic Intellectual Property Management Co., Ltd., Osaka (JP)

(72) Inventors: Hiroyuki Hayashikawa, Osaka (JP); Hitoshi Hongu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,687

(22) PCT Filed: Feb. 2, 2015

(86) PCT No.: PCT/JP2015/000436
§ 371 (c)(1),
(2) Date: Mar. 22, 2016

(87) PCT Pub. No.: WO2015/118848
PCT Pub. Date: Aug. 13, 2015

(65) Prior Publication Data
US 2016/0336706 A1    Nov. 17, 2016

(30) Foreign Application Priority Data
Feb. 10, 2014   (JP) .................. 2014-022963

(51) Int. Cl.
*H01S 3/036* (2006.01)
*H01S 3/104* (2006.01)
*H01S 3/0971* (2006.01)

(52) U.S. Cl.
CPC .............. *H01S 3/036* (2013.01); *H01S 3/104* (2013.01); *H01S 3/0971* (2013.01)

(58) Field of Classification Search
None
See application file for complete search history.

(56) References Cited

U.S. PATENT DOCUMENTS

| 5,303,253 A | 4/1994 | Henning et al. |
| 2006/0049147 A1 | 3/2006 | Hayashikawa et al. |

(Continued)

FOREIGN PATENT DOCUMENTS

| JP | 1-189975 | 7/1989 |
| JP | 1-205585 | 8/1989 |

(Continued)

OTHER PUBLICATIONS

International Search Report of PCT application No. PCT/JP2015/000436 dated Apr. 21, 2015.

(Continued)

*Primary Examiner* — Armando Rodriguez
(74) *Attorney, Agent, or Firm* — Wenderoth, Lind & Ponack, L.L.P.

(57) ABSTRACT

A gas laser oscillation device includes a discharge part, a blower part, and a laser gas path. The discharge part excites a laser gas medium and the blower part blows the laser gas. The laser gas path forms the circulation path of the laser gas between the discharge part and the blower part. The blower part includes an impeller section, a drive section, and an intermediate chamber disposed between the impeller section and the drive section. In the impeller section, a rotating blade to be rotated by a drive section via a rotating shaft is disposed. In the intermediate chamber, a main space and a gas damper space are partially partitioned by a gas shielding member.

12 Claims, 6 Drawing Sheets

(56) References Cited

U.S. PATENT DOCUMENTS

2007/0091969 A1  4/2007  Hayashikawa et al.
2010/0196148 A1  8/2010  Gee et al.

FOREIGN PATENT DOCUMENTS

| JP | 2-001193 | 1/1990 |
| JP | 5-057530 U | 7/1993 |
| JP | 5-078998 U | 10/1993 |
| JP | 10-163546 | 6/1998 |
| JP | 2010/199267 | 9/2010 |
| JP | 2010-212550 | 9/2010 |
| JP | 2010-212567 | 9/2010 |

OTHER PUBLICATIONS

The Extended European Search Report dated May 18, 2016 for the related European Patent Application No. 15746476.9.

GAS LASER OSCILLATION DEVICE

This application is a U.S. national phase application of PCT international application PCT/JP2015/000436 filed on Feb. 2, 2015, which claims priority to Japanese Patent Application No. 2014-022963 filed on Feb. 10, 2014. The disclosures of these applications including the specifications, the drawings, and the claims are hereby incorporated by reference in its entirety.

TECHNICAL FIELD

The present disclosure relates to an axial-flow type gas laser oscillation device in the kW class that is mainly used for cutting a sheet metal and more particularly relates to a blower part disposed in the circulation path of laser gas.

BACKGROUND ART

With reference to FIG. 7 and FIG. 8, a description is provided for a conventional laser oscillation device described in Patent Literature 1.

FIG. 7 is a schematic view showing the conventional laser oscillation device. As shown in FIG. 7, the conventional laser oscillation device includes discharge tube 101, output coupling mirror 102, total reflection mirror 103, electrodes 104, 105, high-frequency power source 106, cooler 107, gas cylinder 108, valve 109, vacuum pump 110, and turbo blower 120. Laser beams are oscillated by the conventional laser oscillation device in the following manner.

The laser gas in gas cylinder 108 is introduced into the laser oscillation device via valve 109. While being cooled by cooler 107, the laser gas is circulated by turbo blower 120 so as to go through discharge tube 101. Voltages are applied to electrode 104 and electrode 105 by high-frequency power source 106. Thereby, the laser gas is excited in discharge tube 101, and the laser light is oscillated. The oscillated laser light reciprocates between output coupling mirror 102 and total reflection mirror 103. Thereby, the energy of the laser light is increased, and the laser light is output to the outside through output coupling mirror 102.

FIG. 8 is a sectional view showing conventional turbo blower 120. As shown in FIG. 8, conventional turbo blower 120 includes turbo blade 121, rotor 122, stator 123, bearings 124, 125, opening 126, intermediate chamber 127, labyrinth seals 128, 129, discharge tube 130, and valve 131. Conventional turbo blower 120 drives in the following manner.

The shaft supported by bearings 124, 125 and having rotor 122 fixed to the shaft is rotated by stator 123, thereby turbo blade 121 fixed to the tip of the shaft rotates. With this operation, the laser gas above turbo blade 121 is sucked and discharged to the sides of turbo blade 121, thus the laser gas is circulated. At the same time, the gas in intermediate chamber 127 is discharged from discharge tube 130 via valve 131. This operation prevents the oil in bearings 124, 125 from entering the laser gas.

CITATION LIST

Patent Literature

PTL 1: Japanese Patent Unexamined Publication No. H01-205585

SUMMARY OF THE INVENTION

In the conventional laser oscillation device, intermediate chamber 127 is connected to the laser gas circulation path by opening 126. Thus, micro-pulses (pressure fluctuations) contained in the airflow in intermediate chamber 127 propagate to the laser gas. With this phenomenon, pulses (pressure fluctuations) occur in the laser gas supplied to discharge tube 101, and the laser light to be oscillated contains micro-vibration.

In order to address the above problem, a laser oscillation device of the present disclosure includes a discharge part, a blower part, and a laser gas path. The discharge part excites a laser gas medium and the blower part blows the laser gas. The laser gas path forms the circulation path of the laser gas between the discharge part and the blower part. The blower part includes an impeller section, a drive section, and an intermediate chamber disposed between the impeller section and the drive section. In the impeller section, a rotating blade to be rotated by a drive section via a rotating shaft is disposed. In the intermediate chamber, a main space and a gas damper space are partially partitioned by a gas shielding member.

The gas laser oscillation device of the present disclosure can output a high-quality laser beam with low oscillation.

DESCRIPTION OF EMBODIMENT

Hereinafter, a description is provided for an exemplary embodiment for implementing the present invention.

Exemplary Embodiment

Figure 1:
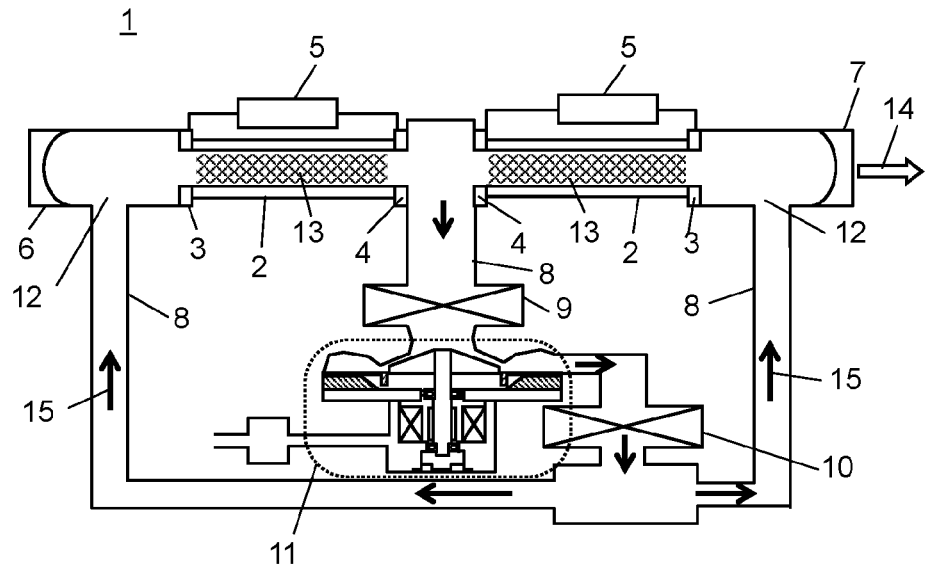
FIG. 1 is a drawing showing a schematic configuration of an axial-flow type gas laser oscillation device in accordance with an exemplary embodiment.

FIG. 1 is a drawing showing a schematic configuration of axial-flow type gas laser oscillation device 1 in accordance with the exemplary embodiment.

As shown in FIG. 1, axial-flow type gas laser oscillation device 1 includes discharge tubes 2, electrodes 3, 4, power sources 5, total reflection mirror 6, partial reflection mirror 7, laser gas flow paths 8 (laser gas paths), heat exchangers 9, 10, blower part 11, and laser gas introduction parts 12.

Each of discharge tubes 2 as a discharge part is formed of a dielectric substance such as glass. Electrode 3 and electrode 4 are disposed on the periphery of discharge tube 2, and high voltage is applied by power source 5 connected to electrodes 3, 4. With this configuration, discharge space 13 is formed in discharge tube 2 interposed between electrode 3 and electrode 4, the laser gas is excited, and the laser light is oscillated. That is, discharge tubes 2 and electrodes 3, 4 form the discharge part. Total refection mirror 6 and partial reflection mirror 7 are fixed at the corresponding ends of discharge space 13 and form an optical resonator. The energy of the oscillated laser light is increased by resonance between total reflection mirror 6 and partial reflection mirror 7, and the laser light is output through partial reflection mirror 7, as laser beam 14.

Laser gas flow 15 shows a circulation direction of laser gas path 8 in axial-flow type gas laser oscillation device 1. Heat exchanger 9 and heat exchanger 10 reduce the temperature of the laser gas increased by the discharge in discharge space 13 and the operation of the blower part. Blower part 11 circulates the laser gas in discharge tube 2 and laser gas path 8.

In this manner, laser gas path 8 forms a circulation path of the laser gas between discharge tubes 2 and blower part 11. Circulation of the laser gas in blower part 11 can provide a gas flow at approximately 100 m/sec in discharge space 13. Laser gas path 8 and discharge tube 2 are connected at laser gas introduction part 12.

The laser gas discharged from blower part 11 goes through laser gas path 8 and is introduced from laser gas introduction part 12 into discharge tube 2. Voltage is applied to the laser gas by electrodes 3, 4 connected to power sources 5, and causes a discharge in discharge space 13.

The laser gas as a laser medium in discharge space 13 is excited by receiving this discharge energy. The laser light generated from the excited laser gas becomes the resonance state in the optical resonator formed by total reflection mirror 6 and partial reflection mirror 7. Laser beam 14 is output from partial reflection mirror 7. Laser beam 14 is used for laser processing such as welding and cutting.

Figure 2:
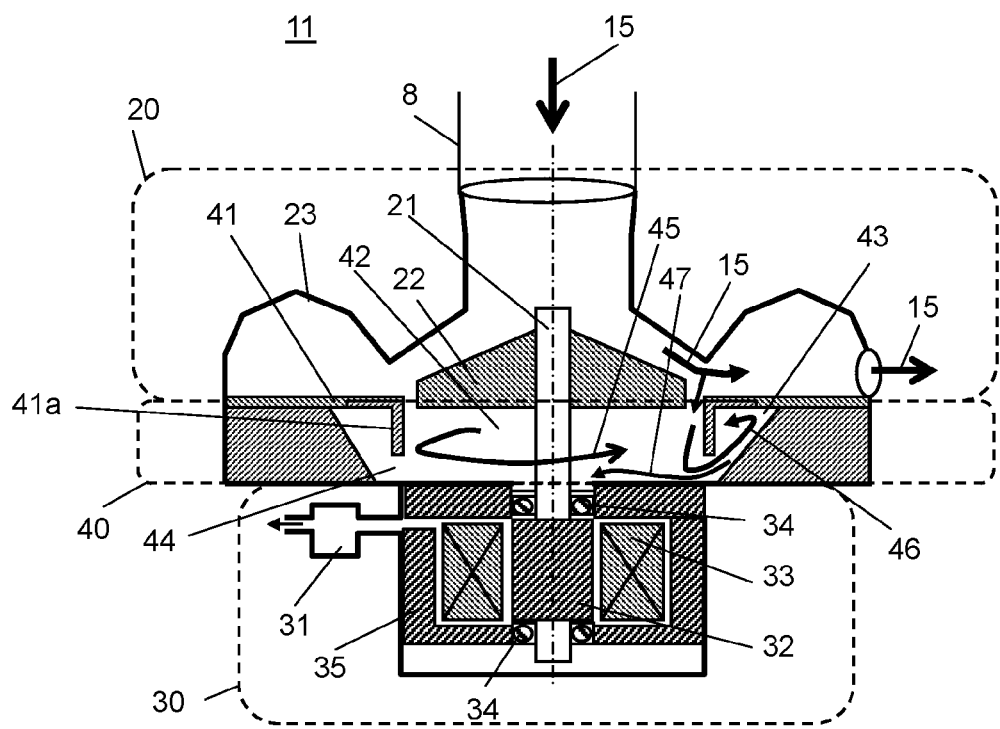
FIG. 2 is a sectional view showing a configuration of a blower part in accordance with the exemplary embodiment.

Next, with reference to FIG. 2, a specific description is provided for blower part 11. FIG. 2 is a sectional view showing a configuration of blower part 11 in accordance with the exemplary embodiment. Blower part 11 is a centrifugal type blower part and has impeller section 20, drive section 30, and intermediate chamber 40.

In impeller section 20, rotating blade 22 disposed on rotating shaft 21 rotates and circulates the laser gas in the direction of laser gas flow 15. Specifically, the laser gas is sucked from laser gas path 8 above rotating blade 22, and discharged to laser gas path 8 on the right side of rotating blade 22. On the periphery of rotating blade 22, scroll housing 23 is disposed and rotating blade 22 rotates at 40000 rpm (revolutions per minute) or faster. This operation generates laser gas flow 15 in laser gas path 8 at approximately 400 m/min or greater.

In drive section 30, vacuum pump 31 is connected and laser gas is discharged from drive section 30 by vacuum pump 31. Though not shown in FIG. 1, new laser gas is introduced into laser gas path 8 and compensates for the laser gas discharged by vacuum pump 31. Further, laser gas is exchanged. Vacuum pump 31 allows the laser gas to flow from impeller section 20 into drive section 30 via intermediate chamber 40. This configuration prevents the oil in drive section 30 from entering laser gas path 8. In drive section 30, motor rotor 32 as a permanent magnet is fixed to rotating shaft 21. Motor stators 33 as electromagnets are disposed on the periphery of motor rotor 32 at intervals. Electric current flowing through motor stators 33 generates a magnetic field inside motor stators 33, thereby rotating motor rotor 32. With this configuration, rotating shaft 21 fixed to motor rotor 32 rotates and rotating blade 22 fixed to rotating shaft 21 rotates inside impeller section 20. Rotating shaft 21 is held by bearings 34 disposed above and below motor rotor 32. Bearings 34 and motor stators 33 are fixed to casing 35.

Intermediate chamber 40 is disposed between impeller section 20 and drive section 30. Intermediate chamber 40 and impeller section 20 are partitioned by stationary blade 41 having an opening slightly larger than that of rotating blade 22. Rotating blade 22 may be positioned above stationary blade 41, the bottom part of rotating blade 22 may be positioned in the opening portion of stationary blade 41, and the bottom part of rotating blade 22 may be positioned inside intermediate chamber 40 via the opening portion of stationary blade 41. Stationary blade 41 includes shielding wall 41a (gas shielding member) that partitions the inside space of intermediate chamber 40 into main space 42 in the center and gas damper space 43 on the periphery of the main space. Shielding wall 41a does not separate main space 42 and gas damper space 43 completely, and main space 42 and gas damper space 43 are connected by opening 44 under shielding wall 41a. Gas damper space 43 is disposed so as to surround the entire circumference of main space 42. However, the configuration of the gas damper space is not limited to the above, and the gas damper space may be disposed locally. Such a structure generates the following three types of gas flow; laser gas flow 45 generated in main space 42; laser gas flow 46 flowing into gas damper space 43 via opening 44; and laser gas flow 47 flowing from gas damper space 43 to drive section 30.

Figure 3:
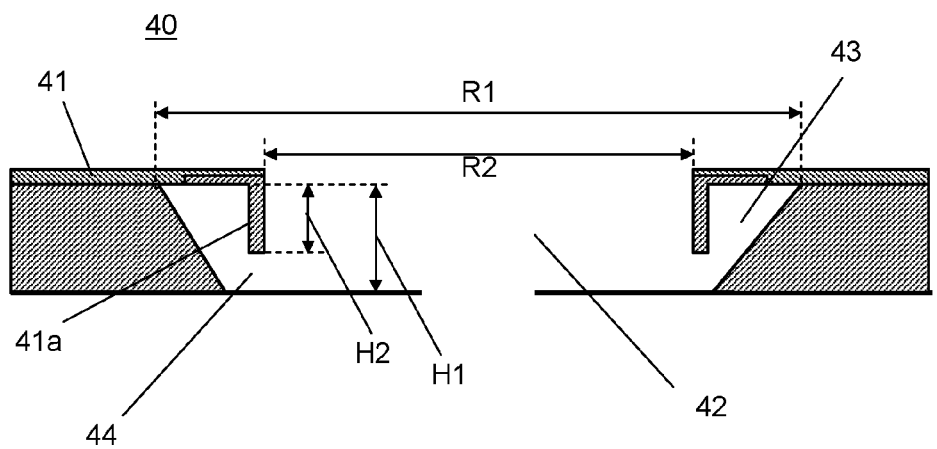
FIG. 3 is a sectional view showing an intermediate chamber in accordance with the exemplary embodiment.
Figure 4:
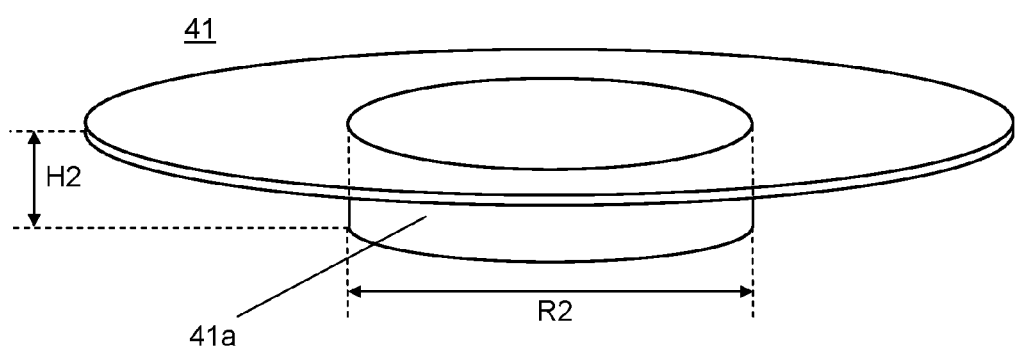
FIG. 4 is a perspective view showing a stationary blade in accordance with the exemplary embodiment.

More specific description is provided for intermediate chamber 40 with reference to FIG. 3 and FIG. 4. FIG. 3 is a sectional view showing intermediate chamber 40 in accordance with the exemplary embodiment. FIG. 4 is a perspective view showing stationary blade 41 in accordance with the exemplary embodiment. As shown in FIG. 3, intermediate chamber 40 includes a space having diameter R1 and height H1 (the entire space including main space 42 and gas damper space 43). As shown in FIG. 3 and FIG. 4, intermediate chamber 40 includes stationary blade 41 that includes shielding wall 41a having opening R2 in diameter and height H2. In this exemplary embodiment, for instance, preferably, the ratio of diameter R2 to diameter R1 is 60% to 90%, and more preferably is 70% to 80%. For instance, preferably, the ratio of height H2 to height H1 is 70% to 95%, and more preferably is 85% to 94%. In other words, it is preferable that 70% to 95% of the boundary between main space 42 and gas damper space 43 is separated. It is more preferable that 85% to 94% of the boundary is separated. That is, it is preferable that 30% to 5% of the boundary between main space 42 and gas damper space 43 is open (both spaces are connected). It is more preferable that 15% to 6% of the boundary is open. For instance, preferably, the volume of gas damper space 43 is 5% to 40% of the volume of the entire space including main space 42 and gas damper space 43, and more preferably is 8% to 20%. Diameter R2 ranges approximately 15 cm to 25 cm. Height H2 ranges 15 mm to 25 mm. Gas damper space 43 connected to main space 42 by opening 44 is disposed in intermediate chamber 40. With this configuration, gas damper space 43 can reduce the pulsation (pressure fluctuations) caused by the airflow of the laser gas generated in intermediate chamber 40 and the pulsation of the laser gas flowing in laser gas path 8, thereby reducing the variations in laser beam 14 output from discharge tube 2.

Figure 5:
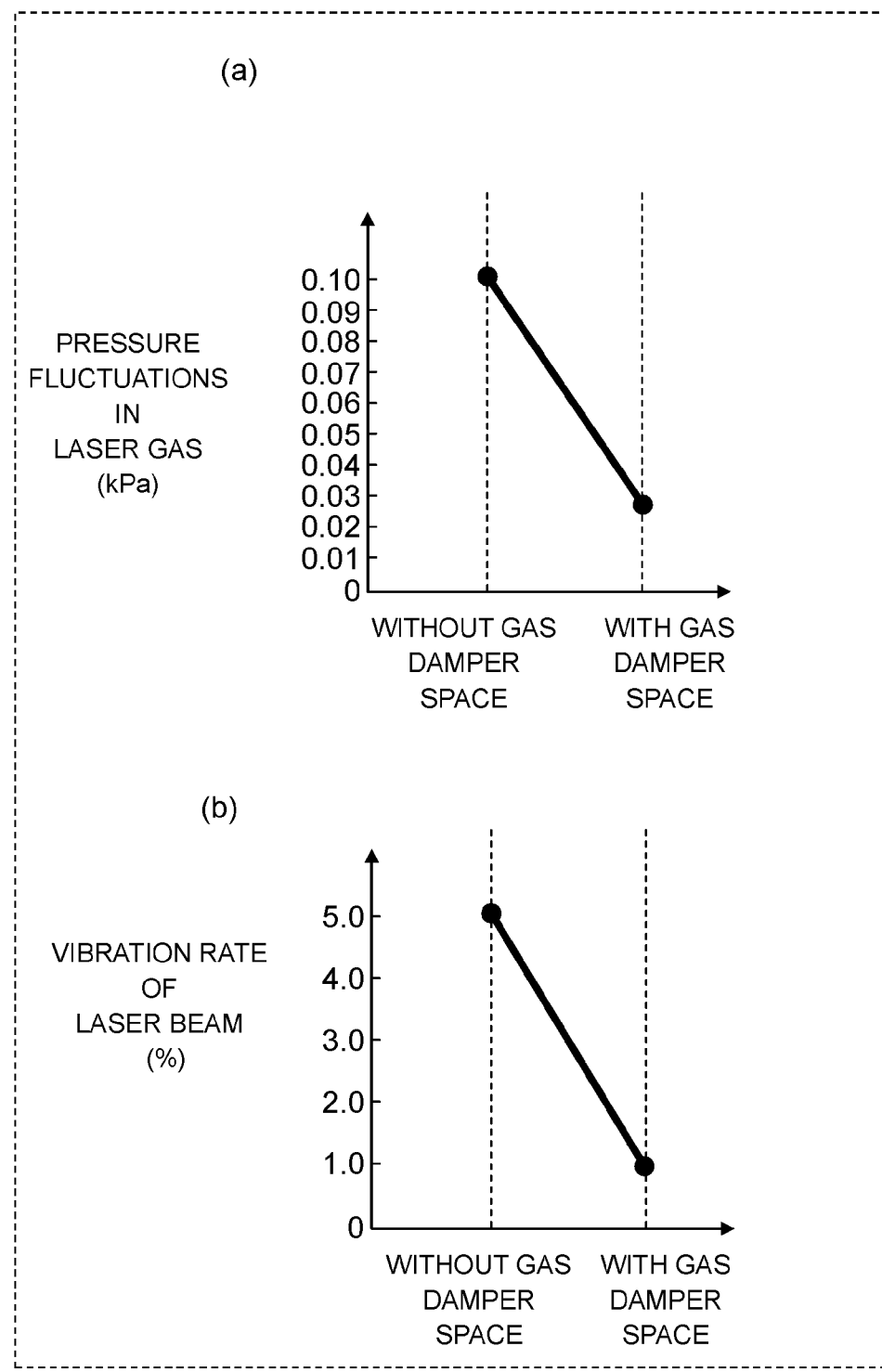
FIG. 5 shows charts showing pressure fluctuations in laser gas (a) and vibration rate of laser beam (b) depending on whether a gas damper space is present or not.

Next, with reference to FIG. 5, an advantageous effect of this exemplary embodiment is described. FIG. 5 shows charts showing pressure fluctuations in laser gas (a), and vibration rate of laser beam (b) depending on whether gas damper space 43 is present or not. As shown in FIG. 5 (a), pressure fluctuations in laser gas (approximately 0.03 kPa) in presence of a gas damper space is equal to or lower than approximately one third the pressure fluctuations in laser gas (approximately 0.10 kPa) in absence of the gas damper space. As shown in FIG. 5 (b), the vibration rate of the laser beam (approximately 1.0%) in presence of a gas damper space is equal to approximately one fifth the vibration rate of the laser beam (approximately 5.0%) in absence of the gas damper space. In this manner, gas damper space 43 disposed in intermediate chamber 40 can considerably reduce pressure fluctuations, thereby considerably reducing vibrations in laser beam 14 to be output.

Figure 6:
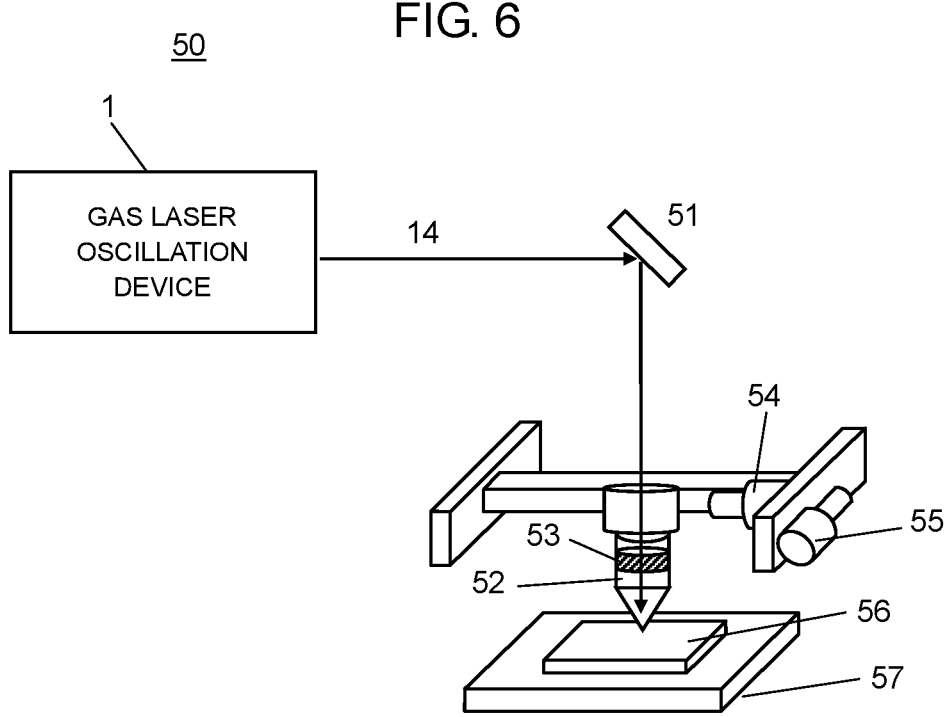
FIG. 6 is a schematic diagram showing a laser processing apparatus in accordance with the exemplary embodiment.
Figure 7:
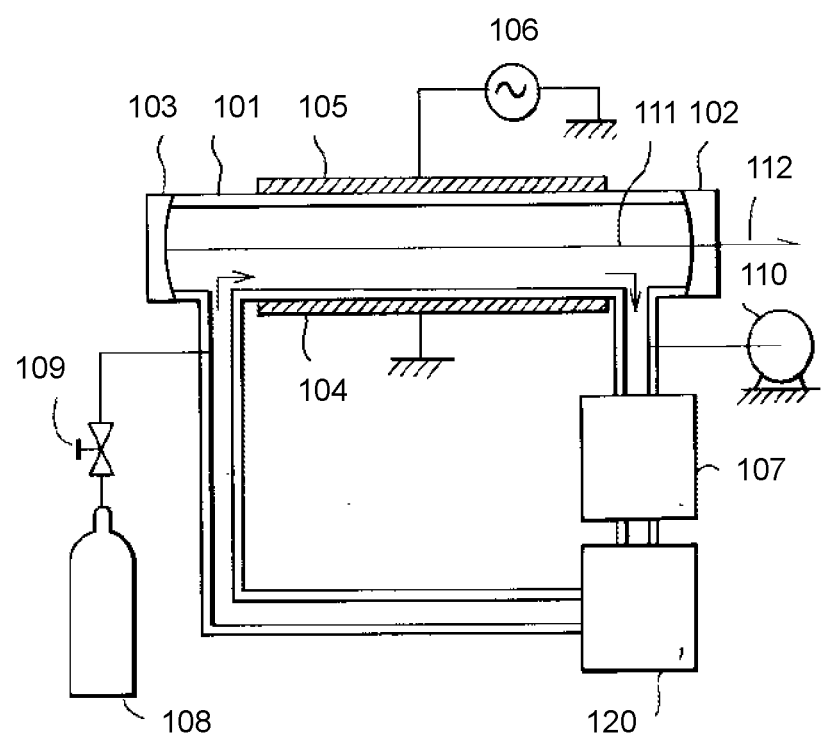
FIG. 7 is a schematic view showing a conventional laser oscillation device.
Figure 8:
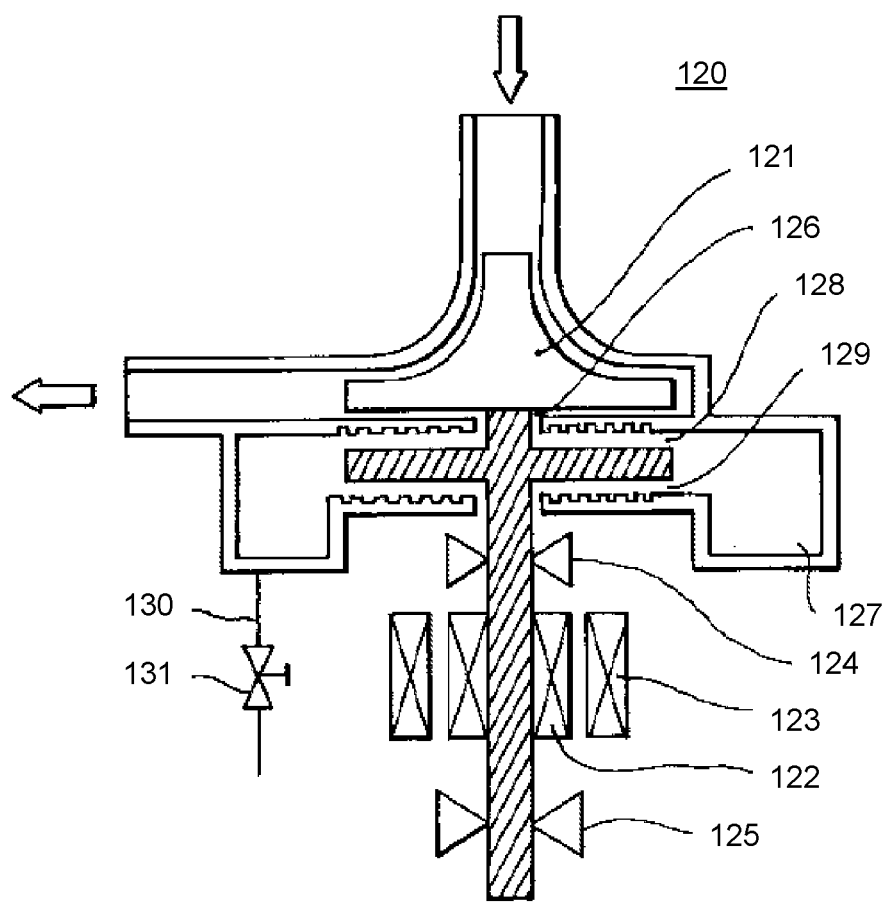
FIG. 8 is a sectional view showing a conventional turbo blower.

Next, with reference to FIG. 6, a description is provided for laser processing apparatus 50 of this exemplary embodiment. FIG. 6 is a schematic diagram showing a laser processing apparatus in accordance with the exemplary embodiment.

As shown in FIG. 6, laser processing apparatus 50 includes axial-flow type gas laser oscillation device 1, refection mirror 51, laser head 52, and workbench 57. Laser beam 14 output from axial-flow type gas laser oscillation device 1 is introduced to laser head 52 by reflection mirror 51 (optical member). In FIG. 6, the number of reflection mirrors 51 is one, but a plurality of reflection mirrors can change the direction of reflected laser beam 14 in two dimensions. Laser beam 14 introduced by laser head 52 is condensed by lens 53 in laser head 52. Condensed laser beam 14 focuses on workpiece 56 mounted on workbench 57 and processes (cuts or welds) workpiece 56. Laser head 52 can be moved by X-axis driver 54 and Y-axis driver 55, above workbench 57 in the X-Y plane in two dimensions.

Laser processing apparatus 50 of the exemplary embodiment is capable of processing workpiece 56 more precisely, rapidly, with a more excellent finish, using laser beam 14 having a low vibration rate that is output from axial-flow type gas laser oscillation device 1.

INDUSTRIAL APPLICABILITY

A gas laser oscillation device of the present disclosure is capable of outputting a high-quality laser beam with low vibration, and is useful as a gas laser oscillation device.

The invention claimed is:

1. A gas laser oscillation device comprising:
   a discharge part for exciting laser gas;
   a blower part for blowing the laser gas; and
   a laser gas path forming a circulation path of the laser gas between the discharge part and the blower part,
   wherein the blower part includes an impeller section, a drive section, and an intermediate chamber disposed between the impeller section and the drive section,
   in the impeller section, a rotating blade to be rotated by the drive section via a rotating shaft is disposed,
   in the intermediate chamber, a main space and a gas damper space are partially partitioned by a gas shielding member, and
   the gas damper space is disposed so as to surround the main space in a plane perpendicular to the rotating shaft.

2. The gas laser oscillation device of claim 1, wherein 70% to 95% of a boundary between the main space and the gas damper space is separated by the gas shielding member.

3. The gas laser oscillation device of claim 1, wherein a volume of the gas damper space is 5% to 40% of a total of a volume of the main space and the volume of the gas damper space.

4. The gas laser oscillation device of claim 1, wherein
   an inside space of the impeller section, the main space of the intermediate chamber, and an inside space of the drive section are in communication with each other, and
   a pressure of the inside space of the drive section is lower than a pressure of the inside space of the impeller section.

5. The gas laser oscillation device of claim 2, wherein a volume of the gas damper space is 5% to 40% of a total of a volume of the main space and the volume of the gas damper space.

6. The gas laser oscillation device of claim 2, wherein
   an inside space of the impeller section, the main space of the intermediate chamber, and an inside space of the drive section are in communication with each other, and
   a pressure of the inside space of the drive section is lower than a pressure of the inside space of the impeller section.

7. The gas laser oscillation device of claim 3, wherein
   an inside space of the impeller section, the main space of the intermediate chamber, and an inside space of the drive section are in communication with each other, and
   a pressure of the inside space of the drive section is lower than a pressure of the inside space of the impeller section.

8. The gas laser oscillation device of claim 5, wherein
   an inside space of the impeller section, the main space of the intermediate chamber, and an inside space of the drive section are in communication with each other, and
   a pressure of the inside space of the drive section is lower than a pressure of the inside space of the impeller section.

9. A gas laser oscillation device comprising:
   a discharge part for exciting laser gas;
   a blower part for blowing the laser gas; and
   a laser gas path forming a circulation path of the laser gas between the discharge part and the blower part,
   wherein the blower part includes an impeller section, a drive section, and an intermediate chamber disposed between the impeller section and the drive section,
   in the impeller section, a rotating blade to be rotated by the drive section via a rotating shaft is disposed,
   in the intermediate chamber, a main space and a gas damper space are partially partitioned by a gas shielding member,
   an inside space of the impeller section, the main space of the intermediate chamber, and an inside space of the drive section are in communication with each other, and
   a pressure of the inside space of the drive section is lower than a pressure of the inside space of the impeller section.

10. The gas laser oscillation device of claim 9, wherein 70% to 95% of a boundary between the main space and the gas damper space is separated by the gas shielding member.

11. The gas laser oscillation device of claim 9, wherein a volume of the gas damper space is 5% to 40% of a total of a volume of the main space and the volume of the gas damper space.

12. The gas laser oscillation device of claim 10, wherein a volume of the gas damper space is 5% to 40% of a total of a volume of the main space and the volume of the gas damper space.

* * * * *